United States Patent
Magdych et al.

(10) Patent No.: US 7,096,503 B1
(45) Date of Patent: Aug. 22, 2006

(54) NETWORK-BASED RISK-ASSESSMENT TOOL FOR REMOTELY DETECTING LOCAL COMPUTER VULNERABILITIES

(75) Inventors: James S. Magdych, Chino, CA (US); Tarik Rahmanovic, Germantown, MD (US); John R. McDonald, Jacksonville, FL (US); Brock E. Tellier, Stamford, CT (US); Anthony C. Osborne, Sydney (AU); Nishad P. Herath, Sydney (AU)

(73) Assignee: McAfee, Inc., Santa Clara, CA (US)

( * ) Notice: Subject to any disclaimer, the term of this patent is extended or adjusted under 35 U.S.C. 154(b) by 1217 days.

(21) Appl. No.: 09/895,508

(22) Filed: Jun. 29, 2001

(51) Int. Cl.
*G06F 11/36* (2006.01)

(52) U.S. Cl. .................. 726/25; 726/22; 713/189; 713/194

(58) Field of Classification Search ................ 713/201; 726/25
See application file for complete search history.

(56) References Cited

U.S. PATENT DOCUMENTS

| | | | | |
|---|---|---|---|---|
| 4,386,233 A | * | 5/1983 | Smid et al. | 380/281 |
| 4,891,506 A | * | 1/1990 | Yoshimatsu | 235/492 |
| 5,787,429 A | | 7/1998 | Nikolin, Jr. | 707/10 |
| 5,892,903 A | * | 4/1999 | Klaus | 713/201 |
| 5,949,877 A | * | 9/1999 | Traw et al. | 713/171 |
| 6,070,244 A | * | 5/2000 | Orchier et al. | 713/201 |
| 6,161,184 A | * | 12/2000 | Niimura | 713/200 |
| 6,298,445 B1 | * | 10/2001 | Shostack et al. | 713/201 |
| 6,334,192 B1 | | 12/2001 | Karpf | 714/1 |
| 6,542,610 B1 | * | 4/2003 | Traw et al. | 380/262 |
| 6,704,871 B1 | * | 3/2004 | Kaplan et al. | 713/192 |
| 2001/0034847 A1 | * | 10/2001 | Gaul, Jr. | 713/201 |
| 2002/0026591 A1 | * | 2/2002 | Hartley et al. | 713/201 |

* cited by examiner

*Primary Examiner*—Ayaz Sheikh
*Assistant Examiner*—David Garcia Cervetti
(74) *Attorney, Agent, or Firm*—Zilka-Kotab, PC; Christopher J. Hamaty

(57) ABSTRACT

A system, method and computer program product are provided for remotely detecting vulnerabilities on a local computer. Initially, an agent is installed on a local computer for receiving encrypted commands from a remote computer utilizing a network. Next, the commands are decrypted and processed on the local computer utilizing the agent. A risk-assessment scan is then performed on the local computer utilizing the agent in accordance with the processed commands for the purpose of remotely detecting local vulnerabilities on the local computer.

27 Claims, 6 Drawing Sheets

NETWORK-BASED RISK-ASSESSMENT TOOL FOR REMOTELY DETECTING LOCAL COMPUTER VULNERABILITIES

FIELD OF THE INVENTION

The present invention relates to risk-assessment scanning methods, and more particularly to performing local risk-assessment scanning from a remote location.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

Some vulnerabilities are considered to be "local" since they are exploited by a local user, rather than a remote attacker. Because these local vulnerabilities require local access or authenticated remote access to the computer system, traditional network security scanners are unfortunately unable to determine whether these local systems are at risk to local threats.

Because local attacks make up a significant percentage of computer crime reported to law enforcement, the inability of automated network scanners to detect these threats presents a serious obstacle to maintaining computer security.

There is thus a need to provide a technique of detecting local threats with a network-based risk-assessment tool.

DISCLOSURE OF THE INVENTION

A system, method and computer program product are provided for remotely detecting vulnerabilities on a local computer. Initially, an agent is installed on a local computer for receiving encrypted commands from a remote computer utilizing a network. Next, the commands are decrypted and processed on the local computer utilizing the agent. A risk-assessment scan is then performed on the local computer utilizing the agent in accordance with the processed commands for the purpose of remotely detecting local vulnerabilities on the local computer.

In one embodiment, the agent may include a plurality of risk-assessment modules. As such, the commands may execute the risk-assessment modules in a specific manner that is configured at the remote computer. Further, the risk-assessment modules of the agent may be selected based on specifications of the local computer.

In one aspect of the present embodiment, the risk-assessment modules may include a STAT module for performing a stat system call on a file, a READ module for reading a file, a READDIR module for returning contents of a directory, a FIND module for locating a list of files based on a given function, a GETPWENT module for retrieving an entry from a password database, a GETGRENT module for retrieving an entry from a group database, a CHKSUM module for performing a checksum operation on a file, and/or an EXEC module for executing a command.

In another aspect of the present embodiment, the commands may each indicate at least one of the risk-assessment modules. Moreover, the commands may be processed by extracting parameters associated with the commands, and executing the risk-assessment modules indicated by the commands utilizing the associated parameters.

In another embodiment, results of the risk-assessment scan may be transmitted from the local computer to the remote computer utilizing the network. As such, feedback to the results may be transmitted from the remote computer utilizing the network. It should be noted that the commands may be decrypted utilizing a shared key, or any other desired technique.

In another aspect, a system, method and computer program product are provided for remotely detecting vulnerabilities utilizing a remote computer. Initially, encrypted commands are transmitted from the remote computer to an agent on a local computer for executing a risk-assessment scan utilizing a network. As mentioned earlier, the commands are decrypted and processed on the local computer utilizing the agent for performing the risk-assessment scan on the local computer in accordance with the processed commands to remotely detect local vulnerabilities on the local computer. Thereafter, results of the risk-assessment scan are received from the local computer utilizing the network. By this design, feedback to the results may be transmitted from the remote computer to the local computer utilizing the network.

DESCRIPTION OF THE PREFERRED EMBODIMENTS

Figure 1:
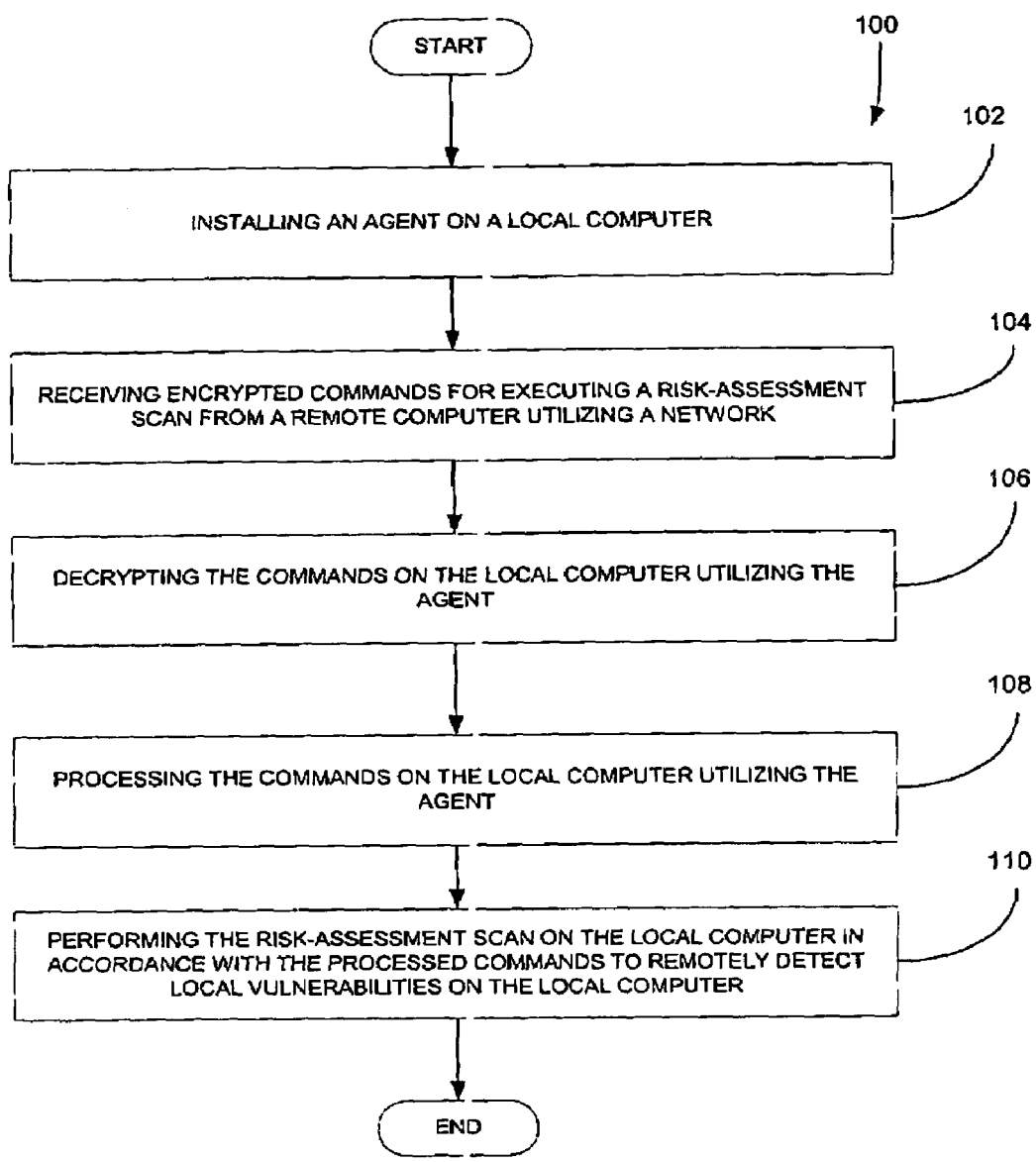
FIG. 1 illustrates a method for remotely detecting vulnerabilities on a local computer.

FIG. 1 illustrates a method 100 for remotely detecting vulnerabilities on a local computer. This is accomplished through the use of a network-based risk-assessment tool which relies on an "agent." Such agent may take the form of a piece of software, specially adapted hardware, or any type of logic running on the local computer.

Initially, in operation 102, the agent is installed on a local computer for receiving commands utilizing a network. See operation 104. For reasons that will soon become apparent, such commands are encrypted for security purposes. In one embodiment, the encryption may be accomplished by way of a pre-shared secret key. In use, the encrypted commands are adapted for executing a risk-assessment scan from a remote computer by controlling the agent.

Next, in operations 106 and 108, the commands are decrypted and processed on the local computer utilizing the agent. The risk-assessment scan is then performed on the local computer in accordance with the processed commands to remotely detect local vulnerabilities on the local computer. See operation 110. In the context of the present description, such vulnerabilities may include any aspect of the local computer that would make it susceptible to an attack or intrusion by a hacker.

To this end, the present methodology allows an administrator to securely and rapidly detect the presence of local threats on many systems from a remote location. This is accomplished without requiring a physical local examination of such systems which may be impractical in large network environments.

Figure 2:
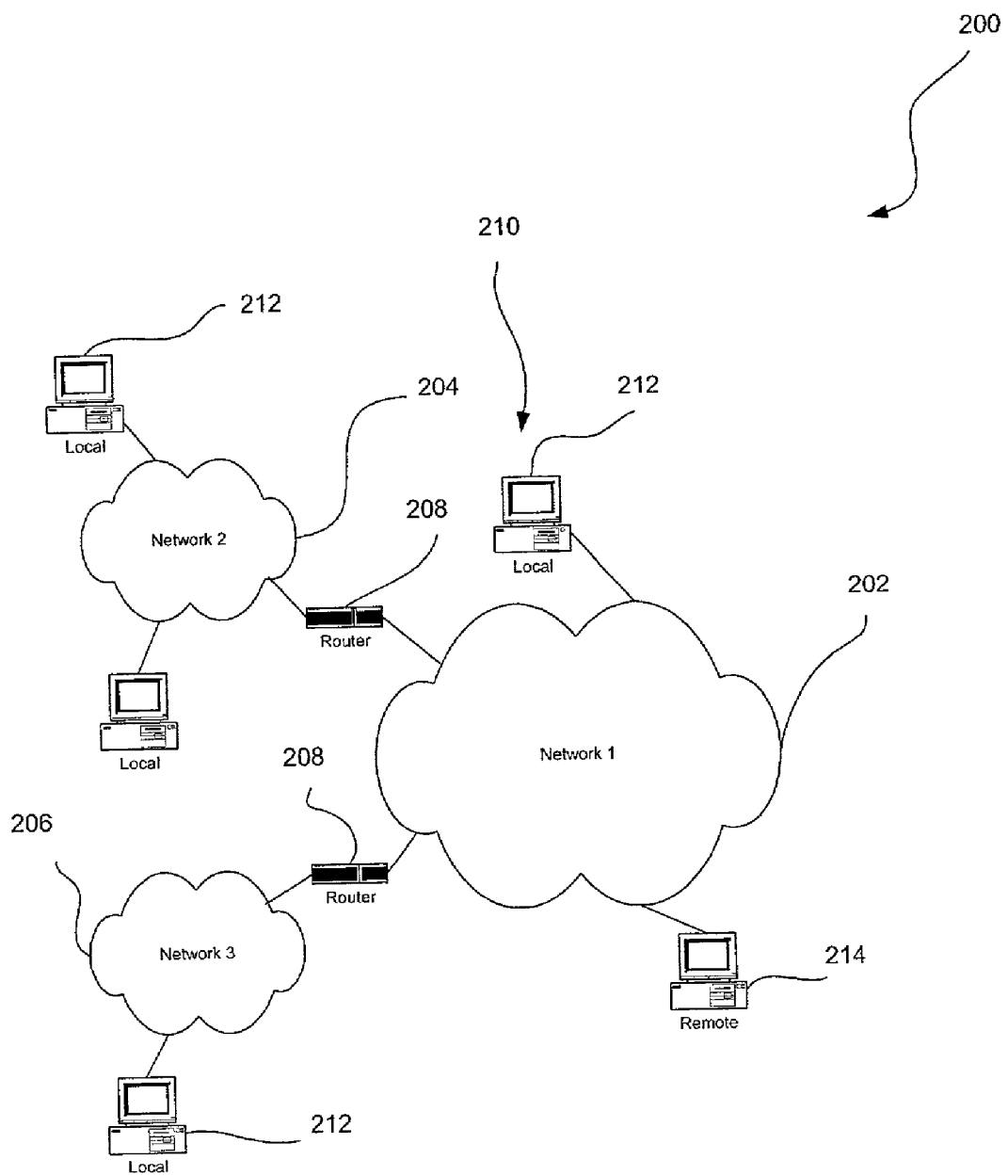
FIG. 2 illustrates an exemplary network environment in which the method of FIG. 1 may be implemented, in accordance with one exemplary embodiment.

FIG. 2 illustrates an exemplary network environment 200 in which the method 100 of FIG. 1 may be implemented, in accordance with one exemplary embodiment. As shown, such network environment 200 includes a first network 202, a second network 204, and a third network 206. Of course, any number of networks may be included. Moreover, such networks may take any form including, but not limited to a local area network (LAN), a wide area network (WAN) such as the Internet, etc. The networks 202, 204 and 206 are coupled via routers 208 for communication purposes.

Coupled to the networks 202, 204 and 206 is a plurality of computers 210 which may take the form of desktop computers, lap-top computers, hand-held computers, or any other type of computing hardware/software. In the context of the present invention, a plurality of local computers 212 are provided which is coupled to at least one remote computer 214 via the networks 202, 204 and 206.

Figure 3:
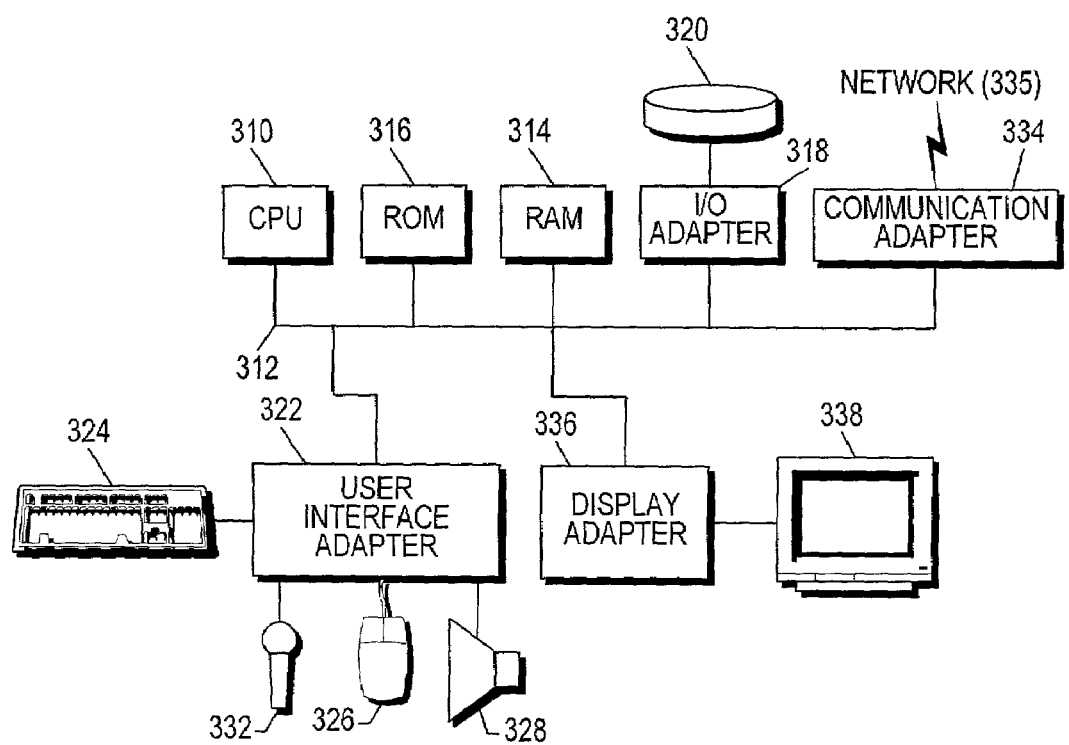
FIG. 3 shows a representative hardware environment associated with the computers of FIG. 2.

FIG. 3 shows a representative hardware environment associated with the computers 210 of FIG. 2. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 4:
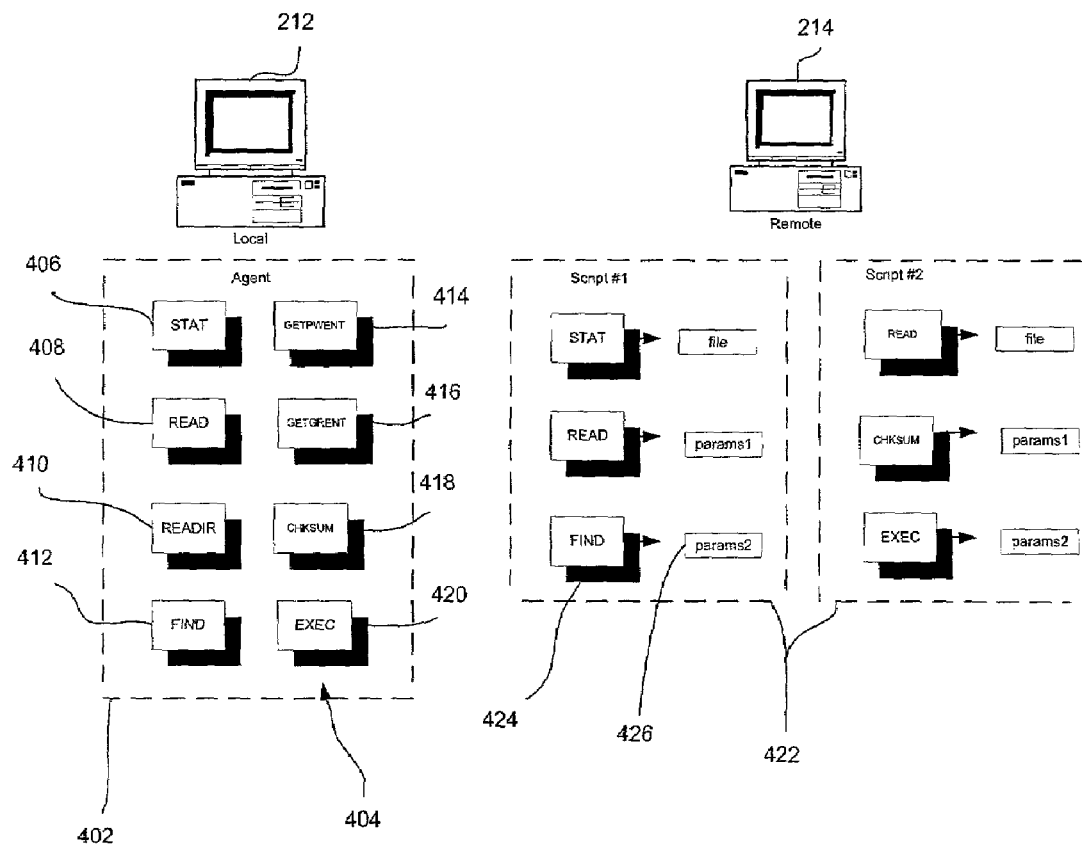
FIG. 4 illustrates the contents of the local computers and the remote computer of FIG. 2, in accordance with one embodiment.

FIG. 4 illustrates the contents of the local computers 212 and the remote computer 214 of FIG. 2, in accordance with one embodiment. As shown, the local computers may each include an agent 402 which in turn includes a plurality of risk-assessment modules 404. In the context of the present description, these risk-assessment modules 404 refer to different functions that work in conjunction to perform a risk-assessment scan. In use, such risk-assessment modules 404 are capable of performing a specific function upon being executed by a command. Moreover, the risk-assessment modules 404 serve to perform a specific function on parameters that are specified by the command.

In one embodiment, each of the local computers 212 may include a unique agent 402 with a specifically tailored set of risk-assessment modules 404. Such unique set of risk-assessment modules 404 may be selected based on specifications, platform, etc. of the particular local computer 212. As such, each agent 402 is ideally suited for operating on the corresponding local computer 212. It should be noted that additional modules may optionally be added to the agent 402 from the remote computer 214 during the course of use.

As an option, the risk-assessment modules 404 may include, but are not limited to a STAT module 406 for performing a stat system call on a file, a READ module 408 for reading a file, a READDIR module 410 for returning contents of a directory, a FIND module 412 for locating a list of files based on a given function, a GETPWENT module 414 for retrieving an entry from a password database, a GETGRENT module 416 for retrieving an entry from a group database, a CHKSUM module 418 for performing a checksum operation on a file, and/or an EXEC module 420 for executing a command.

Table 1 sets forth more information on the above exemplary set of risk-assessment modules 404. It is important to note that this set of risk-assessment modules 404 is merely illustrative in nature and should not be construed as limiting in any manner.

TABLE 1

STAT (file)

Arguments:

file—name of the file to stat
Function:

This risk-assessment module 404 takes a file and performs a stat system call and returns a result.
READ (file, start, end)

Arguments:

file—name of the file to read
start—starting position in file
end—ending position in file
Function:

This risk-assessment module 404 opens and reads a file,

TABLE 1-continued with optional starting and ending parameters. This
allows the administrator to read/dev/kmem/parse.
READDIR (dir)

Arguments:

dir—directory to read
Function:

This risk-assessment module 404 uses getdents( ) or
readdir( ) to return the contents of a directory.
FIND (start, function, arg)

Arguments:

start—place in fs tree to start find
function—function to use when finding files including
the following:
    name—find files named arg
    perm—arg specifies permission mask for finding files
    arg—see function
Function:

This risk-assessment module 404 returns a list of files
that are matched by the specified function. Since FIND
is an expensive operation, multiple filters may be set,
and a RUNFIND command may be executed which returns the
result. This way, the entire tree is only recursed once.
GETPWENT Function:

This risk-assessment module 404 retrieves an entry from
the password database. Each call gets the next entry.
GETGRENT Function:

This risk-assessment module 404 retrieves an entry from
the group database. Each call gets the next entry.
CHKSUM (file)

Arguments:

file—name of the file to checksum
Function:

This risk-assessment module 404 performs a checksum/hash
of a file. It may be used for checking against a list of
known hashes for OS distributions for sensitive binaries
and libs.
EXEC (file, args)

Arguments:

file—name of file to execute
args—initial arguments
Function:

This risk-assessment module 404 is used to execute an
arbitrary command on the system. If a child was
terminated by a signal, this information should be
returned. This risk-assessment module 404 may be used
for testing particular files for buffer overflows, and
could also be used for running ndd and sysctl in order
to determine kernel parameters.

As an option, the agent 402 may process data in system and application log files to identify possible hostile actions that have already occurred. Further, the agent may create and store a hash value (e.g. MD5) to verify the integrity and authenticity of specific files stored on the computer.

With continuing reference to FIG. 4, the remote computer 214 is shown to include a plurality of scripts 422 each including different configurations. In particular, each of such scripts 422 includes a unique set of commands 424 that call a particular set of the risk-assessment modules 404 for performing a predetermined scan. As shown, each command 424 of each script 422 further includes a plurality of parameters 426 upon which the risk-assessment modules 404 may operate.

As mentioned earlier, each of the local computers 212 may include a unique agent 402 with a specifically tailored set of risk-assessment modules 404. As such, the remote computer 214 may include a unique script 422 tailored to accommodate each particular agent 402, as well as performing different types of risk-assessment scans.

Figure 5:
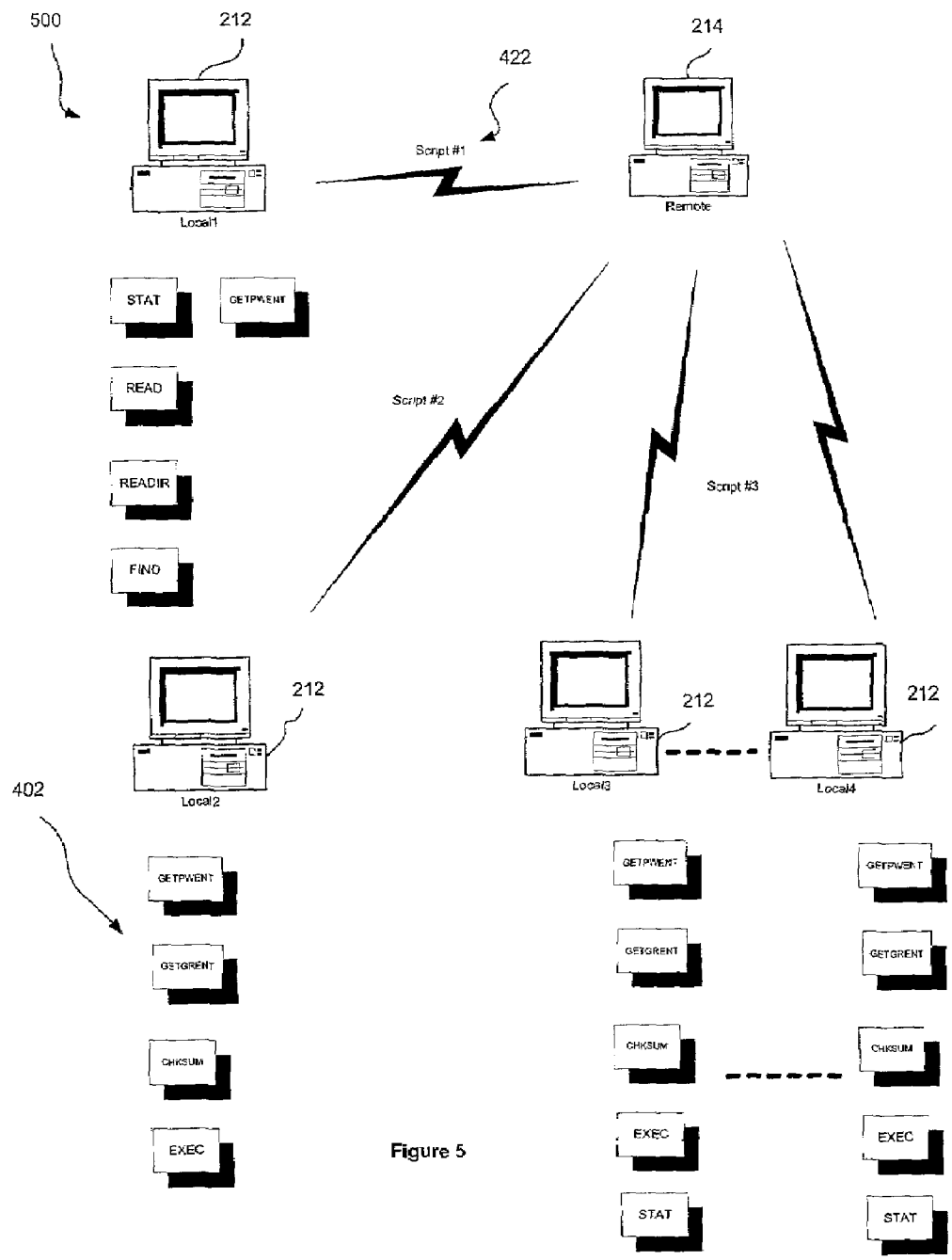
FIG. 5 illustrates a system where the remote computer utilizes a plurality of different scripts to perform different scans on different local computers.

Table 2 illustrates an exemplary set of permutations for the scripts 422. It should be understood that the scripts 422 may be configured to accommodate any variation in the system. FIG. 5 illustrates a system 500 where the remote computer 214 utilizes a plurality of different scripts 422 to perform different scans on different local computers 212 each of which includes varying agents 402.

TABLE 2

Script1 (for scan1 on platform1)
Script2 (for scan1 on platform2)
Script3 (for scan1 on platform3)
Script4 (for scan2 on platform1)
Script5 (for scan2 on platform2)
Script6 (for scan2 on platform3)

Figure 6:
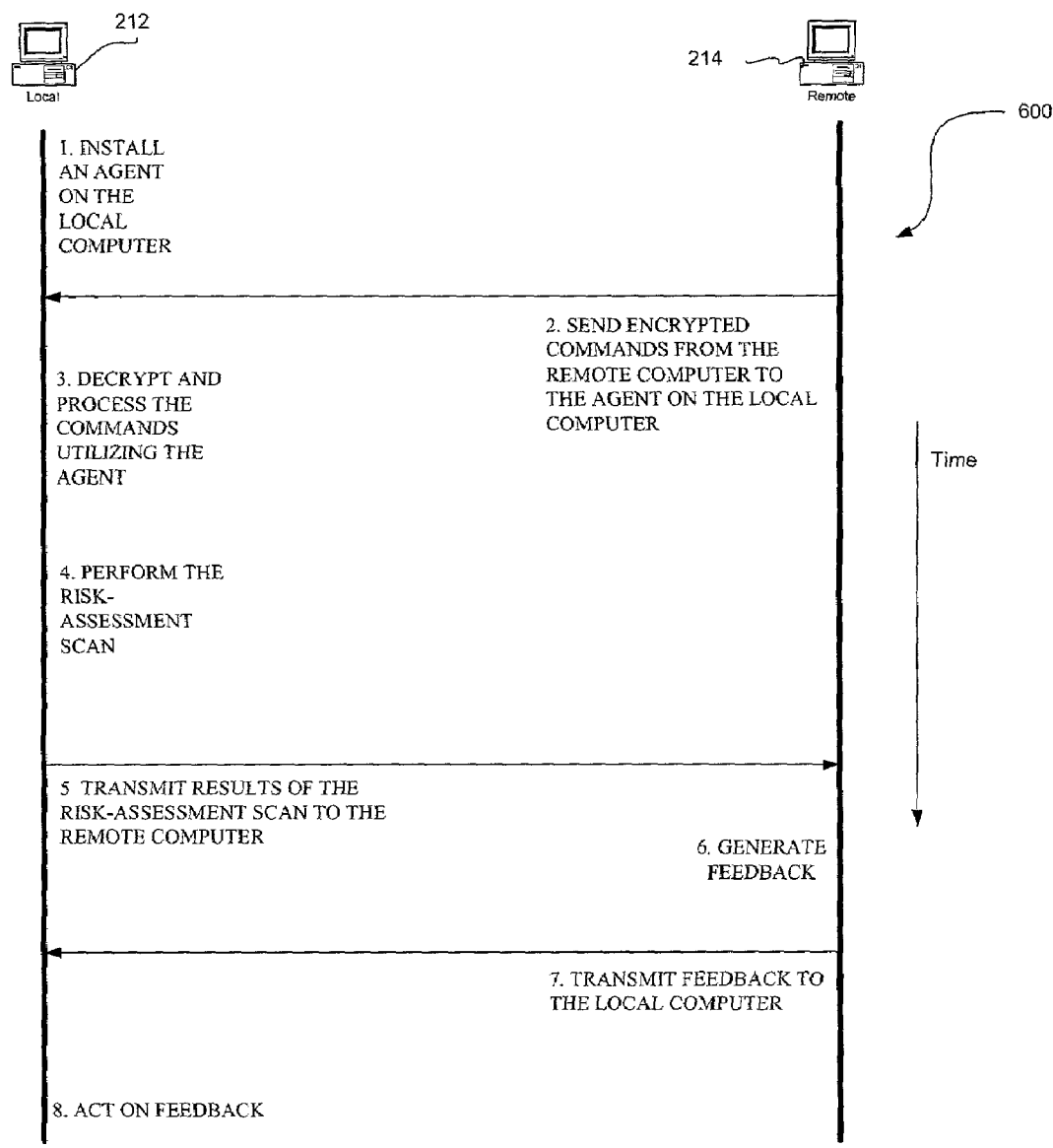
FIG. 6 illustrates the interaction between the local computer and the remote computer for remotely detecting vulnerabilities on the local computer equipped with the aforementioned agent.

FIG. 6 illustrates the interaction 600 between the local computer 212 and the remote computer 214 for remotely detecting vulnerabilities on the local computer 212 equipped with the aforementioned agent 402. While only a single local computer 212 is shown in the present example, it should be understand that the remote computer 214 may simultaneously communicate with numerous local computers 212 in a similar manner. Moreover, multiple remote computers 214 may be employed jointly to facilitate such an effort.

Initially, in operation 1, the agent 402 is installed on the local computer 212 for receiving encrypted commands 424 in the form of scripts 422 utilizing the network. As mentioned earlier, such encrypted commands 424 are adapted for executing the risk-assessment scan from the remote computer 214.

Next, in operation 2, the encrypted commands 424 are transmitted from the remote computer 214 to the agent 402 on the local computer 212 for executing the risk-assessment scan from afar. Thereafter, in operation 3, the commands 424 are decrypted and processed on the local computer 212 utilizing the agent 402. As an option, the commands 424 may be decrypted utilizing a shared key, or any other desired technique. It should be noted that the commands 424 may be authenticated in addition to the being decrypted in operation 3.

Prompted by such commands 424, the risk-assessment scan is then performed in operation 4 on the local computer 212. As mentioned earlier, the commands 424 may each indicate at least one of the risk-assessment modules 404. Moreover, the commands 424 may be processed by extracting parameters 426 associated with the commands 424, and executing the risk-assessment modules 404 indicated by the commands 424 utilizing the associated parameters 426.

With continuing reference to FIG. 6, results of the risk-assessment scan may be transmitted from the local computer 212 to the remote computer 214 utilizing the network. Note operation 5. Such results may include identification of the vulnerabilities, a log of the scan, or any other output of the scan.

As such, feedback to the results may be generated by the remote computer 214 in operation 6. Such feedback may include passive descriptions as to how to correct the vulnerabilities or simply a description thereof. Still yet, the feedback may be active in nature, and include commands 424 to be executed on the local computer 212. In such embodiment, additional modules may be included on the local computer 212 for correcting the vulnerabilities in response to the commands 424.

Once generated, the feedback is transmitted from the remote computer 214 to the local computer 212 in operation 7. In response thereto, the local computer 212 may act on the feedback by simply displaying the same or executing the commands 424. See operation 8.

By this design, an administrator may securely, flexibly and rapidly detect the presence of local threats on many systems from a remote location. This is accomplished without requiring a physical local examination of such systems which may be impractical in large network environments. Further, separate stand-alone software is not installed on the local computer 212 whenever a new type of scan is desired.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of remotely detecting vulnerabilities on a local computer, comprising:
   a) installing an agent on a local computer;
   b) receiving encrypted commands for executing a risk-assessment scan from a remote computer utilizing a network;
   c) decrypting the commands on the local computer utilizing the agent;
   d) processing the commands on the local computer utilizing the agent; and
   e) performing the risk-assessment scan on the local computer in accordance with the processed commands to remotely detect local vulnerabilities on the local computer;
   wherein the agent includes a plurality of risk-assessment modules;
   wherein the commands execute the risk-assessment modules in a specific manner that is configured at the remote computer;
   wherein the commands each indicate at least one of the risk-assessment modules;
   wherein the commands are processed by extracting parameters associated with the commands, and executing the risk-assessment modules indicated by the commands utilizing the associated parameters.

2. The method as recited in claim 1, wherein the risk-assessment modules are selected for the agent based on specifications of the local computer.

3. The method as recited in claim 1, wherein the risk-assessment modules include a STAT module for performing a stat system call on a file, a READ module for reading a file, a READDIR module for returning contents of a directory, a FIND module for locating a list of files based on a given function, a GETPWENT module for retrieving an entry from a password database, a GETGRENT module for retrieving an entry from a group database, a CHKSUM module for performing a checksum operation on a file, and an EXEC module for executing a command.

4. The method as recited in claim 1, wherein the risk-assessment modules are selected from the group consisting of a STAT module for performing a stat system call on a file, a READ module for reading a file, a READDIR module for returning contents of a directory, a FIND module for locating a list of files based on a given function, a GETPWENT module for retrieving an entry from a password database, a GETGRENT module for retrieving an entry from a group database, a CHKSUM module for performing a checksum operation on a file, and an EXEC module for executing a command.

5. The method as recited in claim 1, and further comprising transmitting results of the risk-assessment scan from the local computer to the remote computer utilizing the network.

6. The method as recited in claim 5, and further comprising receiving feedback to the results from the remote computer utilizing the network.

7. The method as recited in claim 1, wherein the commands are decrypted utilizing a shared key.

8. A computer program product embodied on a computer readable medium for remotely detecting vulnerabilities on a local computer, comprising:
   a) computer code for installing an agent on a local computer;
   b) computer code for receiving encrypted commands for executing a risk-assessment scan from a remote computer utilizing a network;
   c) computer code for decrypting the commands on the local computer utilizing the agent;
   d) computer code for processing the commands on the local computer utilizing the agent; and
   e) computer code for performing the risk-assessment scan on the local computer in accordance with the processed commands to remotely detect local vulnerabilities on the local computer;
   wherein the agent includes a plurality of risk-assessment modules;
   wherein the commands execute the risk-assessment modules in a specific manner that is configured at the remote computer;
   wherein the commands each indicate at least one of the risk-assessment modules;
   wherein the commands are processed by extracting parameters associated with the commands, and executing the risk-assessment modules indicated by the commands utilizing the associated parameters.

9. The computer program product as recited in claim 8, wherein the risk-assessment modules are selected for the agent based on specifications of the local computer.

10. The computer program product as recited in claim 8, wherein the risk-assessment modules include a STAT module for performing a stat system call on a file, a READ module for reading a file, a READDIR module for returning contents of a directory, a FIND module for locating a list of files based on a given function, a GETPWENT module for retrieving an entry from a password database, a GETGRENT module for retrieving an entry from a group database, a CHKSUM module for performing a checksum operation on a file, and an EXEC module for executing a command.

11. The computer program product as recited in claim 8, wherein the risk-assessment modules are selected from the group consisting of a STAT module for performing a stat system call on a file, a READ module for reading a file, a READDIR module for returning contents of a directory, a FIND module for locating a list of files based on a given function, a GETPWENT module for retrieving an entry from a password database, a GETGRENT module for retrieving an entry from a group database, a CHKSUM module for performing a checksum operation on a file, and an EXEC module for executing a command.

12. The computer program product as recited in claim 8, and further comprising computer code for transmitting results of the risk-assessment scan from the local computer to the remote computer utilizing the network.

13. The computer program product as recited in claim 12, and further comprising computer code for receiving feedback to the results from the remote computer utilizing the network.

14. The computer program product as recited in claim 8, wherein the commands are decrypted utilizing a shared key.

15. A system for remotely detecting vulnerabilities on a local computer, comprising:
   a) an agent installed on a local computer for receiving encrypted commands for executing a risk-assessment scan from a remote computer utilizing a network, decrypting the commands on the local computer, and processing the commands on the local computer; and
   b) wherein the risk-assessment scan is performed on the local computer in accordance with the processed commands to remotely detect local vulnerabilities on the local computer;
      wherein the agent includes a plurality of risk-assessment modules;
      wherein the commands execute the risk-assessment modules in a specific manner that is configured at the remote computer;
      wherein the commands each indicate at least one of the risk-assessment modules;
      wherein the commands are processed by extracting parameters associated with the commands, and executing the risk-assessment modules indicated by the commands utilizing the associated parameters.

16. A system for remotely detecting vulnerabilities on a local computer, comprising:
   a) means for installing an agent on a local computer;
   b) means for receiving encrypted commands for executing a risk-assessment scan from a remote computer utilizing a network;
   c) means for decrypting the commands on the local computer utilizing the agent;
   d) means for processing the commands on the local computer utilizing the agent; and
   e) means for performing the risk-assessment scan on the local computer in accordance with the processed commands to remotely detect local vulnerabilities on the local computer;
      wherein the agent includes a plurality of risk-assessment modules;
      wherein the commands execute the risk-assessment modules in a specific manner that is configured at the remote computer;
      wherein the commands each indicate at least one of the risk-assessment modules;
      wherein the commands are processed by extracting parameters associated with the commands, and executing the risk-assessment modules indicated by the commands utilizing the associated parameters.

17. A method of remotely detecting vulnerabilities from a remote computer, comprising:
   a) sending encrypted commands from a remote computer to an agent on a local computer for executing a risk-assessment scan utilizing a network, the commands adapted for being decrypted and processed on the local computer utilizing the agent for performing the risk-assessment scan on the local computer in accordance with the processed commands to remotely detect local vulnerabilities on the local computer;
   b) receiving results of the risk-assessment scan from the local computer utilizing the network; and
   c) transmitting feedback to the results from the remote computer to the local computer utilizing the network;
      wherein the agent includes a plurality of risk-assessment modules;
      wherein the commands execute the risk-assessment modules in a specific manner that is configured at the remote computer;
      wherein the commands each indicate at least one of the risk-assessment modules;
      wherein the commands are processed by extracting parameters associated with the commands, and executing the risk-assessment modules indicated by the commands utilizing the associated parameters.

18. A computer program product embodied on a computer readable medium for remotely detecting vulnerabilities from a remote computer, comprising:
   a) computer code for sending encrypted commands from a remote computer to an agent on a local computer for executing a risk-assessment scan utilizing a network, the commands adapted for being decrypted and processed on the local computer utilizing the agent for performing the risk-assessment scan on the local computer in accordance with the processed commands to remotely detect local vulnerabilities on the local computer;
   b) computer code for receiving results of the risk-assessment scan from the local computer utilizing the network; and
   c) computer code for transmitting feedback to the results from the remote computer to the local computer utilizing the network;
      wherein the agent includes a plurality of risk-assessment modules;
      wherein the commands execute the risk-assessment modules in a specific manner that is configured at the remote computer;
      wherein the commands each indicate at least one of the risk-assessment modules;
      wherein the commands are processed by extracting parameters associated with the commands, and executing the risk-assessment modules indicated by the commands utilizing the associated parameters.

19. A method of remotely detecting vulnerabilities on a local computer, comprising:
   a) installing an agent on a local computer, the agent including a plurality of risk-assessment modules selected based on at least one aspect of the computer;
   b) receiving encrypted commands for executing a risk-assessment scan from a remote computer utilizing a network;
   c) decrypting the commands on the local computer utilizing the agent;
   d) authenticating the commands on the local computer utilizing the agent;
   e) processing the commands on the local computer utilizing the agent, the commands adapted to execute the risk-assessment modules in a specific manner that is configured at the remote computer;
   f) performing the risk-assessment scan on the local computer in accordance with the processed commands to remotely detect local vulnerabilities on the local computer;

g) transmitting results of the risk-assessment scan from the local computer to the remote computer utilizing the network;

h) receiving feedback to the results from the remote computer utilizing the network;

wherein the commands each indicate at least one of the risk-assessment modules;

wherein the commands are processed by extracting parameters associated with the commands, and executing the risk-assessment modules indicated by the commands utilizing the associated parameters.

20. The computer program product as recited in claim 6, wherein the feedback is active.

21. The computer program product as recited in claim 20, wherein the feedback includes additional commands and additional modules for correcting the vulnerabilities in response to the additional commands.

22. The computer program product as recited in claim 6, wherein the feedback is passive.

23. The computer program product as recited in claim 22, wherein the feedback includes descriptions as to how to correct the vulnerabilities.

24. The computer program product as recited in claim 5, wherein the results include a log of the risk-assessment scan.

25. The computer program product as recited in claim 24, wherein the results include an identification of the vulnerabilities.

26. The computer program product as recited in claim 1, wherein a plurality of the commands are each associated with only one of the risk-assessment modules.

27. The computer program product as recited in claim 1, wherein a different set of risk-assessment modules exists on different local computers, based on a platform associated with each of the local computers.

* * * * *